(12) United States Patent
Saruwatari et al.

(10) Patent No.: US 12,552,507 B2
(45) Date of Patent: Feb. 17, 2026

(54) OUTBOARD MOTOR AND MARINE VESSEL

(71) Applicant: YAMAHA HATSUDOKI KABUSHIKI KAISHA, Iwata (JP)

(72) Inventors: Kimitaka Saruwatari, Shizuoka (JP); Tomohiro Hagi, Shizuoka (JP); Takuma Matsunaga, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 609 days.

(21) Appl. No.: 18/086,712

(22) Filed: Dec. 22, 2022

(65) Prior Publication Data

US 2023/0219671 A1    Jul. 13, 2023

(30) Foreign Application Priority Data

Jan. 13, 2022  (JP) .................. 2022-003657

(51) Int. Cl.
  *B63H 20/12* (2006.01)
  *B63H 20/06* (2006.01)
  *B63H 20/28* (2006.01)
  *B63H 20/32* (2006.01)
(52) U.S. Cl.
  CPC ............ *B63H 20/12* (2013.01); *B63H 20/06* (2013.01); *B63H 20/285* (2013.01); *B63H 20/32* (2013.01)

(58) Field of Classification Search
  CPC ...... B63H 20/12; B63H 20/06; B63H 20/285; B63H 20/32
  See application file for complete search history.

(56) References Cited

U.S. PATENT DOCUMENTS

| | | | | |
|---|---|---|---|---|
| 5,224,888 | A * | 7/1993 | Fujimoto | B63H 20/08 248/641 |
| 8,246,399 | B2 * | 8/2012 | Inaba | B63H 20/12 440/58 |
| 10,800,502 | B1 * | 10/2020 | Alby | B63H 20/28 |
| 2017/0255205 | A1 * | 9/2017 | Hashizume | G05D 1/0875 |
| 2021/0107615 | A1 | 4/2021 | Takeuchi et al. | |

FOREIGN PATENT DOCUMENTS

| | | |
|---|---|---|
| JP | 2004-306643 A | 11/2004 |
| JP | 2016-137874 A | 8/2016 |
| JP | 2021-62712 A | 4/2021 |

* cited by examiner

*Primary Examiner* — Stephen P Avila
(74) *Attorney, Agent, or Firm* — Keating & Bennett, LLP (57) ABSTRACT

An outboard motor includes a steering mechanism including a pinion located in a central portion of an outboard motor body in a right-left direction and operable to rotate together with the outboard motor body, and a rack operable to linearly move to rotate the pinion, and extending along a forward-rearward direction of the outboard motor body.

20 Claims, 5 Drawing Sheets

OUTBOARD MOTOR AND MARINE VESSEL

CROSS REFERENCE TO RELATED APPLICATIONS

This application claims the benefit of priority to Japanese Patent Application No. 2022-003657 filed on Jan. 13, 2022. The entire contents of this application are hereby incorporated herein by reference.

BACKGROUND OF THE INVENTION

1. Field of the Invention

The present invention relates to an outboard motor and a marine vessel, and more particularly, it relates to an outboard motor and a marine vessel each including a steering mechanism including a rotary member that rotates together with an outboard motor body and a linearly moving member that linearly moves to rotate the rotary member, and operable to rotate the outboard motor body about a steering shaft.

2. Description of the Related Art

An outboard motor including a steering mechanism including a rotary member that rotates together with an outboard motor body and a linearly moving member that linearly moves to rotate the rotary member, and operable to rotate the outboard motor body about a steering shaft is known in general. Such an outboard motor is disclosed in U.S. Pat. No. 10,800,502, for example.

U.S. Pat. No. 10,800,502 discloses an outboard motor including a steering mechanism to rotate an outboard motor body about a steering shaft. In the outboard motor disclosed in U.S. Pat. No. 10,800,502, the steering mechanism includes a rotary member (a pinion, for example) that is located in a central portion of the outboard motor body in a right-left direction and rotates together with the outboard motor body, and a linearly moving member (a rack, for example) that linearly moves along the right-left direction of the outboard motor body to rotate the rotary member. In the outboard motor disclosed in U.S. Pat. No. 10,800,502, the linearly moving member extends along the right-left direction of the outboard motor body.

In the outboard motor disclosed in U.S. Pat. No. 10,800,502, the linearly moving member extends along the right-left direction of the outboard motor body, and thus when an angular range in which the outboard motor body is rotatable about the steering shaft is increased, a distance over which the linearly moving member is linearly moved is relatively increased in the right-left direction of the outboard motor body in which the linearly moving member moves. In such a case, a relatively large space is required in the right-left direction of the outboard motor body to linearly move the linearly moving member. That is, the size of the outboard motor is increased in the right-left direction of the outboard motor body. When the size of the outboard motor is increased in the right-left direction of the outboard motor body, the arrangement of outboard motors is restricted such that adjacent outboard motors do not contact each other when a plurality of outboard motors are attached to a stern of a hull, for example. Therefore, it is desired to increase the angular range in which the outboard motor body is rotatable about the steering shaft while reducing or preventing an increase in the size of the outboard motor in the right-left direction of the outboard motor body.

SUMMARY OF THE INVENTION

Preferred embodiments of the present invention provide outboard motors and marine vessels that each increase angular ranges in which outboard motor bodies are rotatable about steering shafts while reducing or preventing an increase in the sizes of the outboard motors in the right-left direction of the outboard motor bodies.

An outboard motor according to a preferred embodiment of the present invention includes an outboard motor body, and a steering mechanism to rotate the outboard motor body about a steering shaft. The steering mechanism includes a pinion located in a central portion of the outboard motor body in a right-left direction and operable to rotate together with the outboard motor body, and a rack operable to linearly move to rotate the pinion, and extending along a forward-rearward direction of the outboard motor body.

In an outboard motor according to a preferred embodiment of the present invention, the rack extends along the forward-rearward direction of the outboard motor body. Accordingly, when an angular range in which the outboard motor body is rotatable about the steering shaft is increased, a space required to move the rack is relatively increased in the forward-rearward direction of the outboard motor body in which the rack moves, but the space required to move the rack is hardly changed in the right-left direction of the outboard motor body in which the rack does not move. Consequently, the angular range in which the outboard motor body is rotatable about the steering shaft is increased while an increase in the size of the outboard motor in the right-left direction of the outboard motor body is reduced or prevented.

In an outboard motor according to a preferred embodiment of the present invention, the rack is preferably located inward of an outermost end of the outboard motor body in the right-left direction of the outboard motor body. Accordingly, as compared with a case in which the rack is located outward of the outermost end of the outboard motor body in the right-left direction of the outboard motor body, an increase in the size of the outboard motor in the right-left direction of the outboard motor body is reduced or prevented.

In such a case, the outboard motor body preferably includes an engine and a cowling to house the engine, and the rack is preferably located inward of an outermost end of the cowling in the right-left direction of the outboard motor body. Accordingly, the size of the cowling that houses the engine is relatively large in the right-left direction of the outboard motor body, and thus the rack is located inward of the outermost end of the cowling in the right-left direction of the outboard motor body such that the rack is easily located inward of the outermost end of the outboard motor body in the right-left direction of the outboard motor body.

In an outboard motor according to a preferred embodiment of the present invention, the outboard motor body is preferably to be attached to a stern of a hull via a bracket, and the rack is preferably located inward of an outermost end of the bracket in the right-left direction of the outboard motor body. Accordingly, as compared with a case in which the rack is located outward of the outermost end of the bracket in the right-left direction of the outboard motor body, an increase in the size of the outboard motor in the right-left direction of the outboard motor body is further reduced or prevented.

In an outboard motor according to a preferred embodiment of the present invention, the outboard motor body preferably includes an engine and an exhaust passage extending in an upward-downward direction of the outboard motor body and operable to allow an exhaust gas generated in the engine to pass therethrough, and the rack is preferably located within a height range in which the exhaust passage extends in the upward-downward direction of the outboard motor body, and is preferably located outward of the exhaust passage in the right-left direction of the outboard motor body. Accordingly, the rack is located within the height range in which the exhaust passage extends without obstructing the flow of the exhaust gas in the exhaust passage.

In such a case, the pinion is preferably located forward of the exhaust passage. Accordingly, as compared with a case in which the pinion is located rearward of the exhaust passage, the exhaust passage is located relatively rearward in the outboard motor body. Consequently, a structure including the pinion that is located in the central portion of the outboard motor body in the right-left direction and rotates together with the outboard motor body, and the rack that linearly moves to rotate the pinion and extends along the forward-rearward direction of the outboard motor body is easily applied to a general outboard motor in which the exhaust passage through which the exhaust gas generated in the engine passes is located on the rear side of the outboard motor body.

In an outboard motor according to a preferred embodiment of the present invention, the outboard motor body preferably includes an engine and a cooling water passage to allow cooling water to pass therethrough to cool the engine, and the rack is preferably located within a height range in which the cooling water passage extends in an upward-downward direction of the outboard motor body, and is preferably located outward of the cooling water passage in the right-left direction of the outboard motor body. Accordingly, the rack is located within the height range in which the cooling water passage extends without obstructing the flow of the cooling water in the cooling water passage.

In such a case, the cooling water passage preferably includes a cooling water pump to circulate the cooling water in the cooling water passage, the cooling water pump is preferably located at a height at which the rack is provided, and the pinion is preferably located rearward of the cooling water pump. Accordingly, as compared with a case in which the pinion is located forward of the cooling water pump, the cooling water pump is located relatively forward in the outboard motor body. Consequently, a structure including the pinion that is located in the central portion of the outboard motor body in the right-left direction and rotates together with the outboard motor body, and the rack that linearly moves to rotate the pinion and extends along the forward-rearward direction of the outboard motor body is easily applied to a general outboard motor in which the cooling water pump is located on the front side of the outboard motor body to circulate cooling water in the cooling water passage to cool the engine.

In an outboard motor according to a preferred embodiment of the present invention, the rack preferably includes a pair of racks, and the pair of racks are preferably operable to sandwich the pinion from both sides in the right-left direction of the outboard motor body. Accordingly, as compared with a case in which only one rack is provided for the pinion, the magnitude of a torque is improved to rotate the pinion. Consequently, as compared with a case in which only one rack is provided for the pinion, the outboard motor body is smoothly rotated about the steering shaft.

In an outboard motor according to a preferred embodiment of the present invention, the rack is preferably located below an upper end of a stern of a hull. Accordingly, as compared with a case in which the rack is located above the upper end of the stern of the hull, the possibility that the rack is located excessively upward with respect to the outboard motor body is reduced or prevented.

In an outboard motor according to a preferred embodiment of the present invention, the outboard motor body is preferably to be attached to a stern of a hull via a bracket, and the rack is preferably located in a vicinity of a lower end of the bracket in the upward-downward direction of the outboard motor body. Accordingly, as compared with a case in which the rack is located at a position other than the vicinity of the lower end of the bracket in the upward-downward direction of the outboard motor body, the possibility that the rack is located excessively upward or downward with respect to the outboard motor body is reduced or prevented.

In an outboard motor according to a preferred embodiment of the present invention, the outboard motor body preferably includes a lower case in a lower portion of the outboard motor body, the steering mechanism preferably further includes a hydraulic cylinder to house and linearly move the rack, and the hydraulic cylinder preferably includes a front end located forward of a front end of the lower case. Accordingly, as compared with a case in which the front end of the hydraulic cylinder is located rearward of the front end of the lower case, a distance over which the rack is linearly movable is increased in the forward-rearward direction of the outboard motor body. Consequently, as compared with a case in which the front end of the hydraulic cylinder is located rearward of the front end of the lower case, the angular range in which the outboard motor body is rotatable about the steering shaft is increased.

In an outboard motor according to a preferred embodiment of the present invention, the outboard motor body preferably includes an upper portion to be attached to a hull via a bracket, and a lower portion located below the upper portion and on which a propeller is provided, and the steering mechanism is preferably operable to rotate the lower portion about the steering shaft with respect to the upper portion. Accordingly, in a structure in which the lower portion is rotated about the steering shaft with respect to the upper portion, the angular range in which the outboard motor body is rotatable about the steering shaft is increased while an increase in the size of the outboard motor in the right-left direction of the outboard motor body is reduced or prevented.

An outboard motor according to a preferred embodiment of the present invention includes an outboard motor body, and a steering mechanism to rotate the outboard motor body about a steering shaft. The steering mechanism includes a rotary member located in a central portion of the outboard motor body in a right-left direction and operable to rotate together with the outboard motor body, and a linearly moving member operable to linearly move to rotate the rotary member, and extending along a forward-rearward direction of the outboard motor body.

In an outboard motor according to a preferred embodiment of the present invention, the linearly moving member extends along the forward-rearward direction of the outboard motor body. Accordingly, similarly to the outboard motors according to preferred embodiments of the present invention described above, when an angular range in which the outboard motor body is rotatable about the steering shaft is increased, a space required to move the linearly moving member is relatively increased in the forward-rearward direction of the outboard motor body in which the linearly moving member moves, but the space required to move the linearly moving member is hardly changed in the right-left direction of the outboard motor body in which the linearly moving member does not move. Consequently, similarly to the outboard motors according to preferred embodiments of the present invention described above, the angular range in which the outboard motor body is rotatable about the steering shaft is increased while an increase in the size of the outboard motor in the right-left direction of the outboard motor body is reduced or prevented.

A marine vessel according to a preferred embodiment of the present invention includes a hull, and an outboard motor attached to a stern of the hull. The outboard motor includes an outboard motor body, and a steering mechanism to rotate the outboard motor body about a steering shaft. The steering mechanism includes a pinion located in a central portion of the outboard motor body in a right-left direction and operable to rotate together with the outboard motor body, and a rack operable to linearly move to rotate the pinion, and extending along a forward-rearward direction of the outboard motor body.

In a marine vessel according to a preferred embodiment of the present invention, the rack extends along the forward-rearward direction of the outboard motor body. Accordingly, similarly to the outboard motors according to preferred embodiments of the present invention described above, the angular range in which the outboard motor body is rotatable about the steering shaft is increased while an increase in the size of the outboard motor in the right-left direction of the outboard motor body is reduced or prevented.

In a marine vessel according to a preferred embodiment of the present invention, the rack is preferably located inward of an outermost end of the outboard motor body in the right-left direction of the outboard motor body. Accordingly, similarly to the outboard motors according to preferred embodiments of the present invention described above, as compared with a case in which the rack is located outward of the outermost end of the outboard motor body in the right-left direction of the outboard motor body, an increase in the size of the outboard motor in the right-left direction of the outboard motor body is reduced or prevented.

In such a case, the outboard motor body preferably includes an engine and a cowling to house the engine, and the rack is preferably located inward of an outermost end of the cowling in the right-left direction of the outboard motor body. Accordingly, similarly to the outboard motors according to preferred embodiments of the present invention described above, the rack is easily located inward of the outermost end of the outboard motor body in the right-left direction of the outboard motor body.

In a marine vessel according to a preferred embodiment of the present invention, the outboard motor body is preferably attached to the stern of the hull via a bracket, and the rack is preferably located inward of an outermost end of the bracket in the right-left direction of the outboard motor body.

Accordingly, similarly to the outboard motors according to preferred embodiments of the present invention described above, as compared with a case in which the rack is located outward of the outermost end of the bracket in the right-left direction of the outboard motor body, an increase in the size of the outboard motor in the right-left direction of the outboard motor body is further reduced or prevented.

In a marine vessel according to a preferred embodiment of the present invention, the outboard motor body preferably includes an engine and an exhaust passage extending in an upward-downward direction of the outboard motor body and operable to allow an exhaust gas generated in the engine to pass therethrough, and the rack is preferably located within a height range in which the exhaust passage extends in the upward-downward direction of the outboard motor body, and is preferably located outward of the exhaust passage in the right-left direction of the outboard motor body. Accordingly, similarly to the outboard motors according to preferred embodiments of the present invention described above, the rack is located within the height range in which the exhaust passage extends without obstructing the flow of the exhaust gas in the exhaust passage.

In a marine vessel according to a preferred embodiment of the present invention, the outboard motor preferably includes a plurality of outboard motors attached to the stern of the hull and aligned in a right-left direction of the hull. Accordingly, the plurality of outboard motors which increase the angular range in which the outboard motor body is rotatable about the steering shaft while reducing or preventing an increase in the size of the outboard motor in the right-left direction of the outboard motor body are effectively attached to the stern of the hull so as to be aligned in the right-left direction of the hull while contact between the adjacent outboard motors is reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

The structures of outboard motors 100 and a marine vessel 120 according to preferred embodiments of the present invention are now described with reference to FIGS. 1 to 4. In the figures, arrow FWD represents the front of the marine vessel 120, arrow BWD represents the rear of the marine vessel 120, arrow L represents the left (port side) of the marine vessel 120, arrow R represents the right (starboard side) of the marine vessel 120, arrow Z1 represents the upper side of the marine vessel 120, and arrow Z2 represents the lower side of the marine vessel 120.

Figure 1:
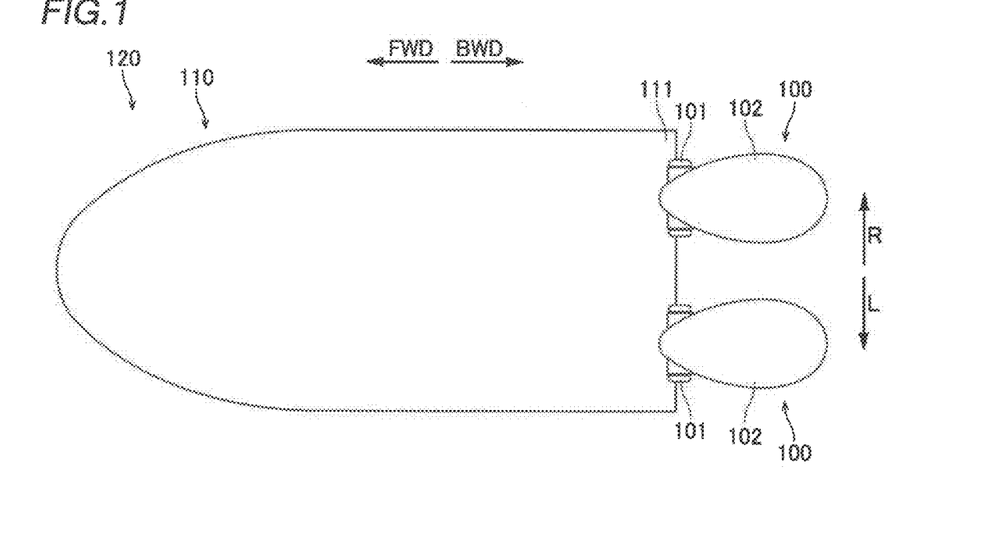
FIG. 1 is a plan view showing a marine vessel according to a preferred embodiment of the present invention.

As shown in FIG. 1, the marine vessel 120 includes a hull 110 and the outboard motors 100. The outboard motors 100 are marine propulsion devices that propel the hull 110. The outboard motors 100 are attached to a stern 111 of the hull 110. A plurality of (two in preferred embodiments of the present invention) outboard motors 100 are attached side by side in the right-left direction of the hull 110. The marine vessel 120 may be a relatively small marine vessel used for sightseeing or fishing, for example.

Figure 2:
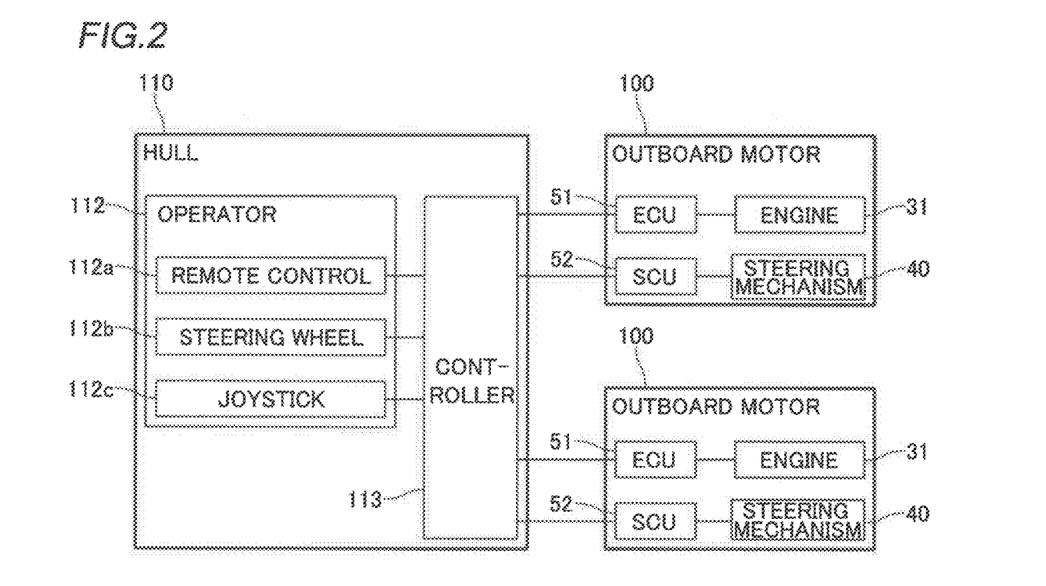
FIG. 2 is a block diagram showing the structure of a control system in a marine vessel according to a preferred embodiment of the present invention.

As shown in FIG. 2, the hull 110 includes an operator 112 to receive an operation to operate (maneuver) the marine vessel 120. The operator 112 includes a remote control 112a, a steering wheel 112b, and a joystick 112c.

The remote control 112a includes a tiltable lever. The lever of the remote control 112a is tilted such that the thrusts (the rotation speeds of propellers 35 (see FIG. 3)) of the outboard motors 100 are changed and/or the shift states (the forward movement states, the reverse movement states, or the neutral states) of the outboard motors 100 are switched, for example.

The steering wheel 112b is rotatable. The steering wheel 112b is rotated to steer the outboard motors 100 (change the orientations of the propellers 35 (see FIG. 3) with respect to the hull 110).

The marine vessel 120 (see FIG. 1) is translated and turned, for example, by combinations of operations on the remote control 112a and operations on the steering wheel 112b.

The joystick 112c includes a tiltable and rotatable lever. The lever of the joystick 112c is tilted, rotated, or tilted and rotated such that the thrusts of the outboard motors 100 are changed and/or the shift states of the outboard motors 100 are switched, the outboard motors 100 are steered, or the thrusts of the outboard motors 100 are changed and/or the shift states of the outboard motors 100 are switched and the outboard motors 100 are steered, for example.

The lever of the joystick 112c is tilted to translate the marine vessel 120 (see FIG. 1). The lever of the joystick 112c is tilted and rotated to turn the marine vessel 120. The lever of the joystick 112c is rotated to rotate the marine vessel 120.

The joystick 112c includes a joystick mode switch. In the marine vessel 120, the joystick mode switch is pressed to switch an operation mode between a joystick mode and a non-joystick mode. In the joystick mode, the marine vessel 120 does not receive operations on the remote control 112a and the steering wheel 112b, but receives an operation on the joystick 112c. In the non-joystick mode, the marine vessel 120 does not receive an operation on the joystick 112c, but receives operations on the remote control 112a and the steering wheel 112b.

The hull 110 includes a controller 113 to control the outboard motors 100 (engine control units (ECUs) 51, steering control units (SCUs) 52, etc. of the outboard motors 100) based on an operation on the operator 112. The controller 113 includes a central processing unit (CPU), a read-only memory (ROM), a random access memory (RAM), etc., for example.

Figure 3:
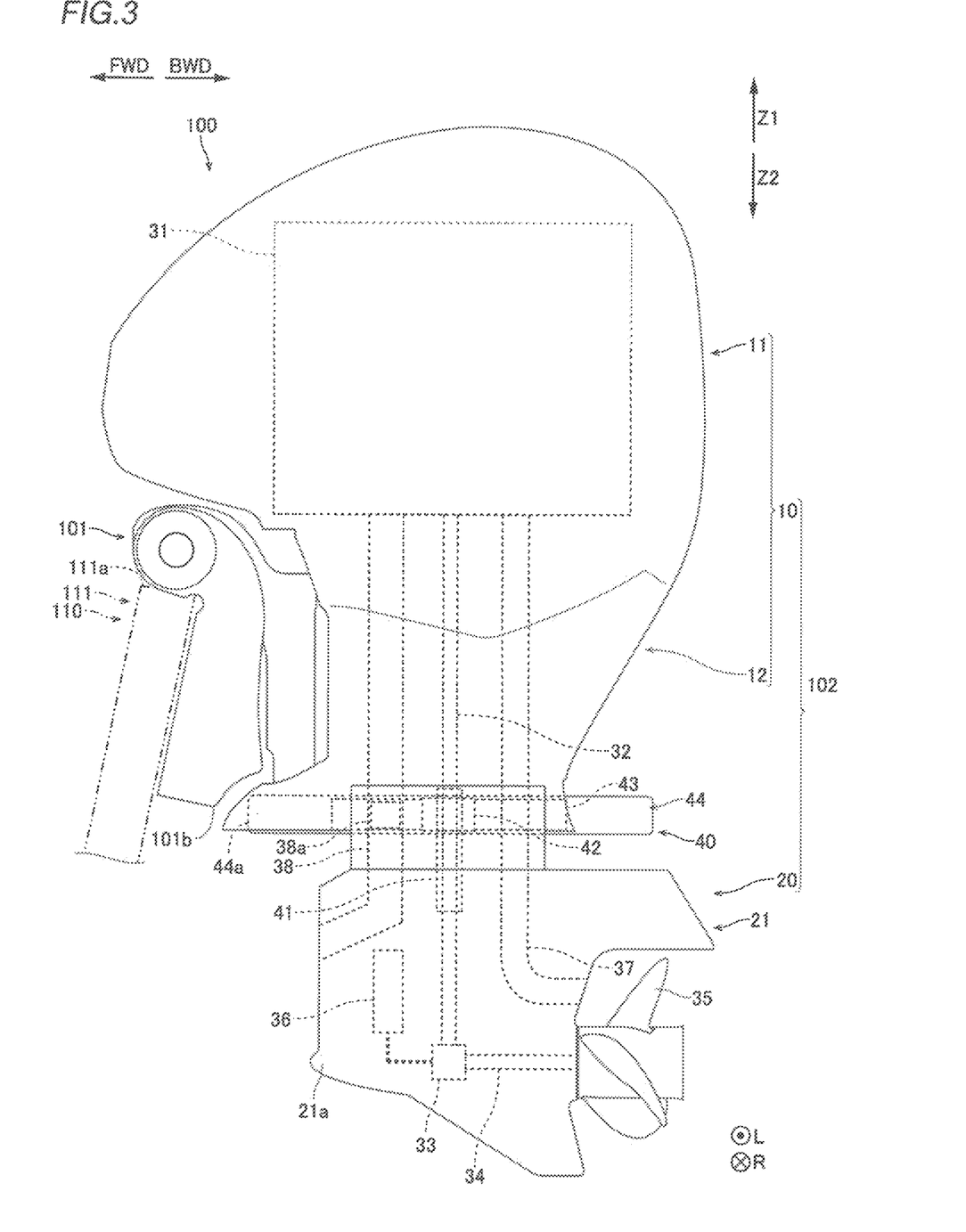
FIG. 3 is a side view showing an outboard motor according to a preferred embodiment of the present invention.

As shown in FIG. 3, each of the outboard motors 100 includes an outboard motor body 102 attached to the stern 111 of the hull 110 via a bracket 101. Specifically, the outboard motor body 102 includes an upper portion 10 attached to the stern 111 of the hull 110 via the bracket 101, and a lower portion 20 located below the upper portion 10 and on which the propeller 35 is provided. The upper portion 10 includes a cowling 11 to house an engine 31, and an upper case 12 located below the cowling 11 and attached to the stern 111 of the hull 110. The lower portion 20 includes a lower case 21. That is, the outboard motor body 102 includes the lower case 21 in a lower portion of the outboard motor body 102.

Each of the outboard motors 100 is an engine outboard motor including the engine 31 to drive the propeller 35. Specifically, the outboard motor body 102 includes the engine 31, a drive shaft 32, a gearing 33, a propeller shaft 34, and the propeller 35. The engine 31 is an internal combustion engine that generates a driving force. The drive shaft 32 extends in an upward-downward direction across the cowling 11 and the lower case 21. The drive shaft 32 is connected to a crankshaft (not shown) of the engine 31. The gearing 33 is located in the lower case 21. The gearing 33 is connected to a lower end of the drive shaft 32. The propeller shaft 34 is connected to the gearing 33. The propeller shaft 34 extends in a forward-rearward direction behind the gearing 33. The propeller 35 is connected to a rear end of the propeller shaft 34. The propeller 35 is located outside the lower case 21 to be exposed to the outside of the outboard motor body 102. A driving force is transmitted from the engine 31 to the propeller 35 via the drive shaft 32, the gearing 33, and the propeller shaft 34. The propeller 35 generates a thrust by rotating in the water by the driving force transmitted from the engine 31.

The outboard motor body 102 includes a shift actuator 36 to switch the shift state (the forward movement state, the reverse movement state, or the neutral state) of the outboard motor 100. The shift actuator 36 switches the shift state of the outboard motor 100 between the forward movement state, the backward movement state, and the neutral state by switching the meshing of the gearing 33. In the forward movement state of the outboard motor 100, a driving force is transmitted from the engine 31 to the propeller 35 to generate a forward propulsive force from the propeller 35. In the reverse movement state of the outboard motor 100, a driving force is transmitted from the engine 31 to the propeller 35 to generate a reverse propulsive force from the propeller 35. In the neutral state of the outboard motor 100, a driving force is not transmitted from the engine 31 to the propeller 35.

The outboard motor 100 includes a steering mechanism 40 to rotate a portion of the outboard motor body 102 about a steering shaft 41. The steering mechanism 40 rotates the lower portion 20 about the steering shaft 41 with respect to the upper portion 10. That is, in the outboard motor 100, only a portion (the lower portion 20) of the outboard motor body 102 rotates with respect to the hull 110. The steering mechanism 40 is described below in detail.

As shown in FIG. 2, the outboard motor 100 includes the ECU 51 to control the engine 31 and the SCU 52 to control the steering mechanism 40. The ECU 51 controls driving of the engine 31 and driving of the shift actuator 36 based on a control by the controller 113 provided in the hull 110. The SCU 52 controls driving of the steering mechanism 40 based on a control by the controller 113. The ECU 51 and the SCU 52 include a CPU, a ROM, a RAM, etc., for example.

As shown in FIG. 3, the outboard motor body 102 includes an exhaust passage 37 through which an exhaust gas generated in the engine 31 passes. The exhaust passage 37 extends in the upward-downward direction of the outboard motor body 102 across the cowling 11 and the lower case 21. The exhaust passage 37 includes an exhaust outlet through which the exhaust gas generated in the engine 31 is discharged to the outside of the outboard motor body 102. The exhaust outlet is provided on the rear side of the lower case 21. The exhaust gas that has passed through the exhaust passage 37 is discharged to the outside of the outboard motor body 102 via the exhaust outlet provided on the rear side of the lower case 21.

The outboard motor body 102 includes a cooling water passage 38 through which cooling water passes to cool the engine 31. The cooling water passage 38 extends in the upward-downward direction of the outboard motor body 102 across the lower case 21 and the cowling 11. The cooling water passage 38 includes an intake port to take in water that serves as cooling water from the outside of the outboard motor body 102. The intake port is provided on the front side of the lower case 21. The cooling water passage 38 also includes a cooling water pump 38*a* to circulate cooling water in the cooling water passage 38. The water taken in via the intake port is supplied to the engine 31 as cooling water to cool the engine 31 by the cooling water pump 38*a*.

Figure 4:
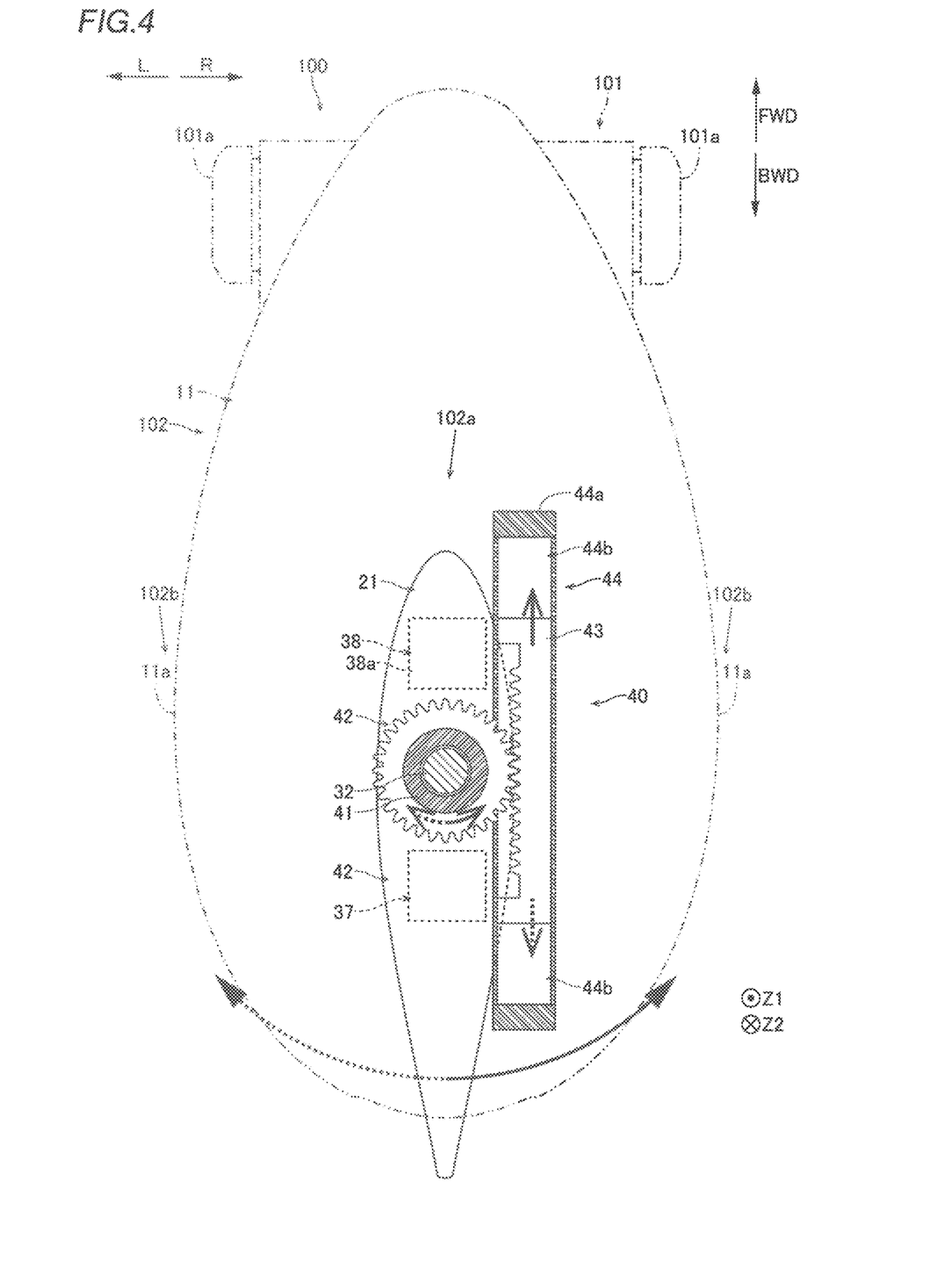
FIG. 4 is a plan view showing a steering mechanism of an outboard motor according to a preferred embodiment of the present invention.

As shown in FIG. 4, the steering mechanism 40 includes a pinion 42 that rotates together with the portion (the lower portion 20) of the outboard motor body 102, and a rack 43 that linearly moves to rotate the pinion 42. That is, the steering mechanism 40 converts linear motion into rotary motion with the rack 43 and the pinion 42. In the steering mechanism 40, one rack 43 is provided for the pinion 42.

The pinion 42 is provided in a central portion 102*a* of the outboard motor body 102 in the right-left direction. The steering shaft 41 is provided inside the pinion 42. The pinion 42 is fixed to the steering shaft 41 such that the steering shaft 41 rotates as the pinion 42 rotates. As shown in FIG. 3, the steering shaft 41 is fixed to an upper portion of the lower case 21 such that the lower case 21 rotates as the steering shaft 41 rotates.

The steering shaft 41 is hollow. The steering shaft 41 extends in the upward-downward direction across a lower portion of the upper case 12 and the upper portion of the lower case 21. As shown in FIG. 4, the drive shaft 32 penetrates through a central portion of the steering shaft 41 such that the drive shaft 32 does not contact the steering shaft 41.

The rack 43 engages with teeth of the pinion 42 on the starboard side of the pinion 42. The rack 43 extends along the forward-rearward direction of the outboard motor body 102. When the rack 43 linearly moves along the forward-rearward direction of the outboard motor body 102 while engaging with the teeth of the pinion 42, the pinion 42 is rotated.

The steering mechanism 40 includes a hydraulic cylinder 44 to house and linearly move the rack 43. The hydraulic cylinder 44 extends along the forward-rearward direction. As shown in FIG. 3, a front end 44*a* of the hydraulic cylinder 44 is located forward of a front end 21*a* of the lower case 21. As shown in FIG. 4, two oil chambers 44*b* are provided inside the hydraulic cylinder 44. The two oil chambers 44*b* are provided on a first side and a second side of the rack 43 in a direction (the forward-rearward direction of the outboard motor body 102) in which the rack 43 extends. A hydraulic pump (not shown) is driven by a pump drive motor (not shown) to supply hydraulic oil to one of the two oil chambers 44*b* and to discharge hydraulic oil from the other of the two oil chambers 44*b*. The amount of hydraulic oil in the two oil chambers 44*b* is adjusted such that the rack 43 linearly moves inside the hydraulic cylinder 44.

The rack 43 is located inward of the outermost end 102*b* of the outboard motor body 102 in the right-left direction of the outboard motor body 102. Specifically, the rack 43 is located inward of the outermost end 11*a* of the cowling 11 in the right-left direction of the outboard motor body 102. The rack 43 is located inward of the outermost end 101*a* of the bracket 101 in the right-left direction of the outboard motor body 102.

As shown in FIG. 3, the rack 43 is located within a height range in which the exhaust passage 37 is provided in the upward-downward direction of the outboard motor body 102. As shown in FIG. 4, the rack 43 is located outward of the exhaust passage 37 in the right-left direction of the outboard motor body 102. In other words, teeth of the rack 43 that engage with the pinion 42 are located outward of the exhaust passage 37 in the right-left direction of the outboard motor body 102. The pinion 42 is located forward of the exhaust passage 37.

As shown in FIG. 3, the rack 43 is located within a height range in which the cooling water passage 38 is provided in the upward-downward direction of the outboard motor body 102. As shown in FIG. 4, the rack 43 is located outward of the cooling water passage 38 in the right-left direction of the outboard motor body 102. In other words, the teeth of the rack 43 that engage with the pinion 42 are located outward of the cooling water passage 38 in the right-left direction of the outboard motor body 102. As shown in FIG. 3, the cooling water pump 38*a* is located at a height at which the rack 43 is provided. For example, the cooling water pump 38*a* may overlap or substantially overlaps the rack 43 in the right-left direction of the outboard motor body 102. As shown in FIG. 4, the cooling water pump 38*a* is located forward of the pinion 42. That is, the pinion 42 is located rearward of the cooling water pump 38*a*.

As shown in FIG. 3, the rack 43 is located below an upper end 111*a* of the stern 111 of the hull 110. Specifically, the rack 43 is located in the vicinity of a lower end 101*b* of the bracket 101 in the upward-downward direction of the outboard motor body 102. For example, the rack 43 may be located at the same or substantially the same height as the lower end 101*b* of the bracket 101 in the upward-downward direction of the outboard motor body 102.

According to the various preferred embodiments of the present invention described above, the following advantageous effects are achieved.

According to a preferred embodiment of the present invention, the rack 43 extends along the forward-rearward direction of the outboard motor body 102. Accordingly, when an angular range in which the outboard motor body 102 is rotatable about the steering shaft 41 is increased, a space required to move the rack 43 is relatively increased in the forward-rearward direction of the outboard motor body 102 in which the rack 43 moves, but the space required to move the rack 43 is hardly changed in the right-left direction of the outboard motor body 102 in which the rack 43 does not move. Consequently, the angular range in which the outboard motor body 102 is rotatable about the steering shaft is increased while an increase in the size of the outboard motor 100 in the right-left direction of the outboard motor body 102 is reduced or prevented.

According to a preferred embodiment of the present invention, the rack 43 is located inward of the outermost end 102*b* of the outboard motor body 102 in the right-left direction of the outboard motor body 102. Accordingly, as compared with a case in which the rack 43 is located outward of the outermost end 102*b* of the outboard motor body 102 in the right-left direction of the outboard motor body 102, an increase in the size of the outboard motor 100 in the right-left direction of the outboard motor body 102 is reduced or prevented.

According to a preferred embodiment of the present invention, the outboard motor body 102 includes the engine 31 and the cowling 11 to house the engine 31. Furthermore, the rack 43 is located inward of the outermost end 11*a* of the cowling 11 in the right-left direction of the outboard motor body 102. Accordingly, the size of the cowling 11 that houses the engine 31 is relatively large in the right-left direction of the outboard motor body 102, and thus the rack 43 is located inward of the outermost end 11a of the cowling 11 in the right-left direction of the outboard motor body 102 such that the rack 43 is easily located inward of the outermost end 11a of the outboard motor body 102 in the right-left direction of the outboard motor body 102.

According to a preferred embodiment of the present invention, the outboard motor body 102 is attached to the stern 111 of the hull 110 via the bracket 101. Furthermore, the rack 43 is located inward of the outermost end 101a of the bracket 101 in the right-left direction of the outboard motor body 102. Accordingly, as compared with a case in which the rack 43 is located outward of the outermost end 101a of the bracket 101 in the right-left direction of the outboard motor body 102, an increase in the size of the outboard motor 100 in the right-left direction of the outboard motor body 102 is further reduced or prevented.

According to a preferred embodiment of the present invention, the outboard motor body 102 includes the engine 31 and the exhaust passage 37 extending in the upward-downward direction of the outboard motor body 102 and operable to allow the exhaust gas generated in the engine 31 to pass therethrough. The rack 43 is located within the height range in which the exhaust passage 37 is provided in the upward-downward direction of the outboard motor body 102. Furthermore, the rack 43 is located outward of the exhaust passage 37 in the right-left direction of the outboard motor body 102. Accordingly, the rack 43 is located within the height range in which the exhaust passage 37 is provided without obstructing the flow of the exhaust gas in the exhaust passage 37.

According to a preferred embodiment of the present invention, the pinion 42 is located forward of the exhaust passage 37. Accordingly, as compared with a case in which the pinion 42 is located rearward of the exhaust passage 37, the exhaust passage 37 is located relatively rearward in the outboard motor body 102. Consequently, a structure including the pinion 42 that is located in the central portion 102a of the outboard motor body 102 in the right-left direction and rotates together with the outboard motor body 102, and the rack 43 that linearly moves to rotate the pinion 42 and extends along the forward-rearward direction of the outboard motor body 102 is easily applied to the outboard motor 100 in which the exhaust passage 37 through which the exhaust gas generated in the engine 31 passes is located on the rear side of the outboard motor body 102.

According to a preferred embodiment of the present invention, the outboard motor body 102 includes the engine 31 and the cooling water passage 38 to allow cooling water to pass therethrough to cool the engine 31. The rack 43 is located within the height range in which the cooling water passage 38 is provided in the upward-downward direction of the outboard motor body 102. Furthermore, the rack 43 is located outward of the cooling water passage 38 in the right-left direction of the outboard motor body 102. Accordingly, the rack 43 is located within the height range in which the cooling water passage 38 is provided without obstructing the flow of the cooling water in the cooling water passage 38.

According to a preferred embodiment of the present invention, the cooling water passage 38 includes the cooling water pump 38a to circulate cooling water in the cooling water passage 38. The cooling water pump 38a is located at the height at which the rack 43 is provided. Furthermore, the pinion 42 is located rearward of the cooling water pump 38a. Accordingly, as compared with a case in which the pinion 42 is located forward of the cooling water pump 38a, the cooling water pump 38a is located relatively forward in the outboard motor body 102. Consequently, a structure including the pinion 42 that is located in the central portion 102a of the outboard motor body 102 in the right-left direction and rotates together with the outboard motor body 102, and the rack 43 that linearly moves to rotate the pinion 42 and extends along the forward-rearward direction of the outboard motor body 102 is easily applied to the outboard motor 100 in which the cooling water pump 38a is located on the front side of the outboard motor body 102 to circulate cooling water in the cooling water passage 38 to cool the engine 31.

According to a preferred embodiment of the present invention, the rack 43 is located below the upper end 111a of the stern 111 of the hull 110. Accordingly, as compared with a case in which the rack 43 is located above the upper end 111a of the stern 111 of the hull 110, the possibility that the rack 43 is located excessively upward with respect to the outboard motor body 102 is reduced or prevented.

According to a preferred embodiment of the present invention, the outboard motor body 102 is attached to the stern 111 of the hull 110 via the bracket 101. Furthermore, the rack 43 is located in the vicinity of the lower end 101b of the bracket 101 in the upward-downward direction of the outboard motor body 102. Accordingly, as compared with a case in which the rack 43 is located at a position other than the vicinity of the lower end 101b of the bracket 101 in the upward-downward direction of the outboard motor body 102, the possibility that the rack 43 is located excessively upward or downward with respect to the outboard motor body 102 is reduced or prevented.

According to a preferred embodiment of the present invention, the outboard motor body 102 includes the lower case 21 in the lower portion of the outboard motor body 102. The steering mechanism 40 includes the hydraulic cylinder 44 to house and linearly move the rack 43. Furthermore, the front end 44a of the hydraulic cylinder 44 is located forward of the front end 21a of the lower case 21. Accordingly, as compared with a case in which the front end 44a of the hydraulic cylinder 44 is located rearward of the front end 21a of the lower case 21, a distance over which the rack 43 is linearly movable is increased in the forward-rearward direction of the outboard motor body 102. Consequently, as compared with a case in which the front end 44a of the hydraulic cylinder 44 is located rearward of the front end 21a of the lower case 21, the angular range in which the outboard motor body 102 is rotatable about the steering shaft 41 is increased.

According to a preferred embodiment of the present invention, the outboard motor body 102 includes the upper portion 10 attached to the hull 110 via the bracket 101, and the lower portion 20 located below the upper portion 10 and on which the propeller 35 is provided. Furthermore, the steering mechanism 40 is operable to rotate the lower portion 20 about the steering shaft 41 with respect to the upper portion 10. Accordingly, in a structure in which the lower portion 20 is rotated about the steering shaft 41 with respect to the upper portion 10, the angular range in which the outboard motor body 102 is rotatable about the steering shaft 41 is increased while an increase in the size of the outboard motor 100 in the right-left direction of the outboard motor body 102 is reduced or prevented.

According to a preferred embodiment of the present invention, the plurality of outboard motors 100 each including the steering mechanism 40 including the rack 43 and the pinion 42 are attached to the stern 111 of the hull 110 so as to be aligned in the right-left direction of the hull 110.

Accordingly, the plurality of outboard motors 100 that increase the angular range in which the outboard motor body 102 is rotatable about the steering shaft 41 while reducing or preventing an increase in the size of the outboard motor 100 in the right-left direction of the outboard motor body 102 are effectively attached to the stern 111 of the hull 110 so as to be aligned in the right-left direction of the hull 110 while contact between the adjacent outboard motors 100 is reduced or prevented.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while the plurality of outboard motors 100 each including the steering mechanism 40 including the rack 43 and the pinion 42 are preferably attached to the stern 111 of the hull 110 so as to be aligned in the right-left direction of the hull 110 in preferred embodiments described above, the present invention is not restricted to this. In a preferred embodiment of the present invention, only one outboard motor including the steering mechanism including the rack and the pinion may alternatively be attached to the stern of the hull.

While the steering mechanism 40 preferably rotates the lower portion 20 about the steering shaft 41 with respect to the upper portion 10 in preferred embodiments described above, the present invention is not restricted to this. In a preferred embodiment of the present invention, the steering mechanism may alternatively rotate the entire outboard motor body about the steering shaft with respect to the hull.

While the front end 44a of the hydraulic cylinder 44 is preferably located forward of the front end 21a of the lower case 21 in preferred embodiments described above, the present invention is not restricted to this. In a preferred embodiment of the present invention, the front end of the hydraulic cylinder may alternatively be located rearward of the front end of the lower case.

While the rack 43 is preferably located in the vicinity of the lower end 101b of the bracket 101 in the upward-downward direction of the outboard motor body 102 in preferred embodiments described above, the present invention is not restricted to this. In a preferred embodiment of the present invention, the rack may alternatively be located at a position other than the vicinity of the lower end of the bracket in the upward-downward direction of the outboard motor body.

While the rack 43 is preferably located below the upper end 111a of the stern 111 of the hull 110 in preferred embodiments described above, the present invention is not restricted to this. In a preferred embodiment of the present invention, the rack may alternatively be located above the upper end of the stern of the hull.

While the rack 43 is preferably located on the starboard side of the pinion 42 in preferred embodiments described above, the present invention is not restricted to this. In a preferred embodiment of the present invention, the rack may alternatively be located on the port side of the pinion.

Figure 5:
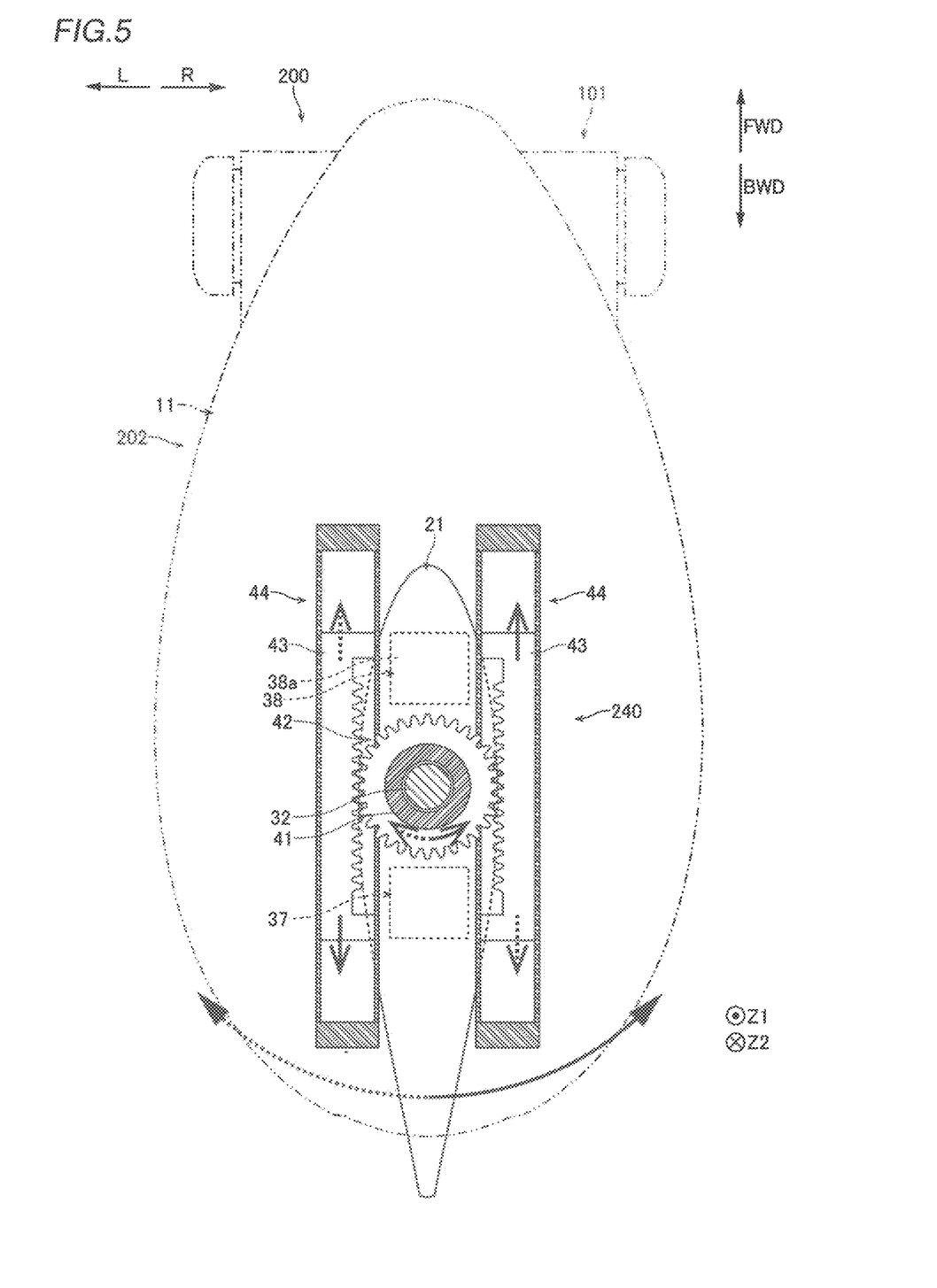
FIG. 5 is a plan view showing a steering mechanism of an outboard motor according to a first modified example of a preferred embodiment of the present invention.

While one rack 43 is preferably provided for the pinion 42 in preferred embodiments described above, the present invention is not restricted to this. In a preferred embodiment of the present invention, as in a first modified example shown in FIG. 5, a plurality of racks may alternatively be provided for a pinion. As shown in FIG. 5, an outboard motor 200 according to the first modified example includes an outboard motor body 202 and a steering mechanism 240. In the steering mechanism 240, a pair of racks 43 are provided for a pinion 42. The pair of racks 43 sandwich the pinion 42 from both sides in the right-left direction of the outboard motor body 202. Accordingly, as compared with a case in which only one rack 43 is provided for the pinion 42, the magnitude of a torque is improved to rotate the pinion 42. Consequently, as compared with a case in which only one rack 43 is provided for the pinion 42, the outboard motor body 202 is smoothly rotated about a steering shaft 41.

While the pinion 42 is preferably located rearward of the cooling water pump 38a in preferred embodiments described above, the present invention is not restricted to this. In a preferred embodiment of the present invention, the pinion may alternatively be located forward of the cooling water pump.

While the rack 43 is preferably located outward of the cooling water passage 38 in the right-left direction of the outboard motor body 102 in preferred embodiments described above, the present invention is not restricted to this. In a preferred embodiment of the present invention, the rack may alternatively be located inward of the cooling water passage in the right-left direction of the outboard motor body.

While the pinion 42 is preferably located forward of the exhaust passage 37 in preferred embodiments described above, the present invention is not restricted to this. In a preferred embodiment of the present invention, the pinion may alternatively be located rearward of the exhaust passage.

While the rack 43 is preferably located outward of the exhaust passage 37 in the right-left direction of the outboard motor body 102 in preferred embodiments described above, the present invention is not restricted to this. In a preferred embodiment of the present invention, the rack may alternatively be located inward of the exhaust passage in the right-left direction of the outboard motor body.

While the rack 43 is preferably located inward of the outermost end 101a of the bracket 101 in the right-left direction of the outboard motor body 102 in preferred embodiments described above, the present invention is not restricted to this. In a preferred embodiment of the present invention, the rack may alternatively be located outward of the outermost end of the bracket in the right-left direction of the outboard motor body.

While the rack 43 is preferably located inward of the outermost end 11a of the cowling 11 in the right-left direction of the outboard motor body 102 in preferred embodiments described above, the present invention is not restricted to this. In a preferred embodiment of the present invention, the rack may alternatively be located outward of the outermost end of the cowling in the right-left direction of the outboard motor body.

While the rack 43 is preferably located inward of the outermost end 101a of the outboard motor body 102 in the right-left direction of the outboard motor body 102 in preferred embodiments described above, the present invention is not restricted to this. In a preferred embodiment of the present invention, the rack may alternatively be located outward of the outermost end of the outboard motor body in the right-left direction of the outboard motor body.

Figure 6:
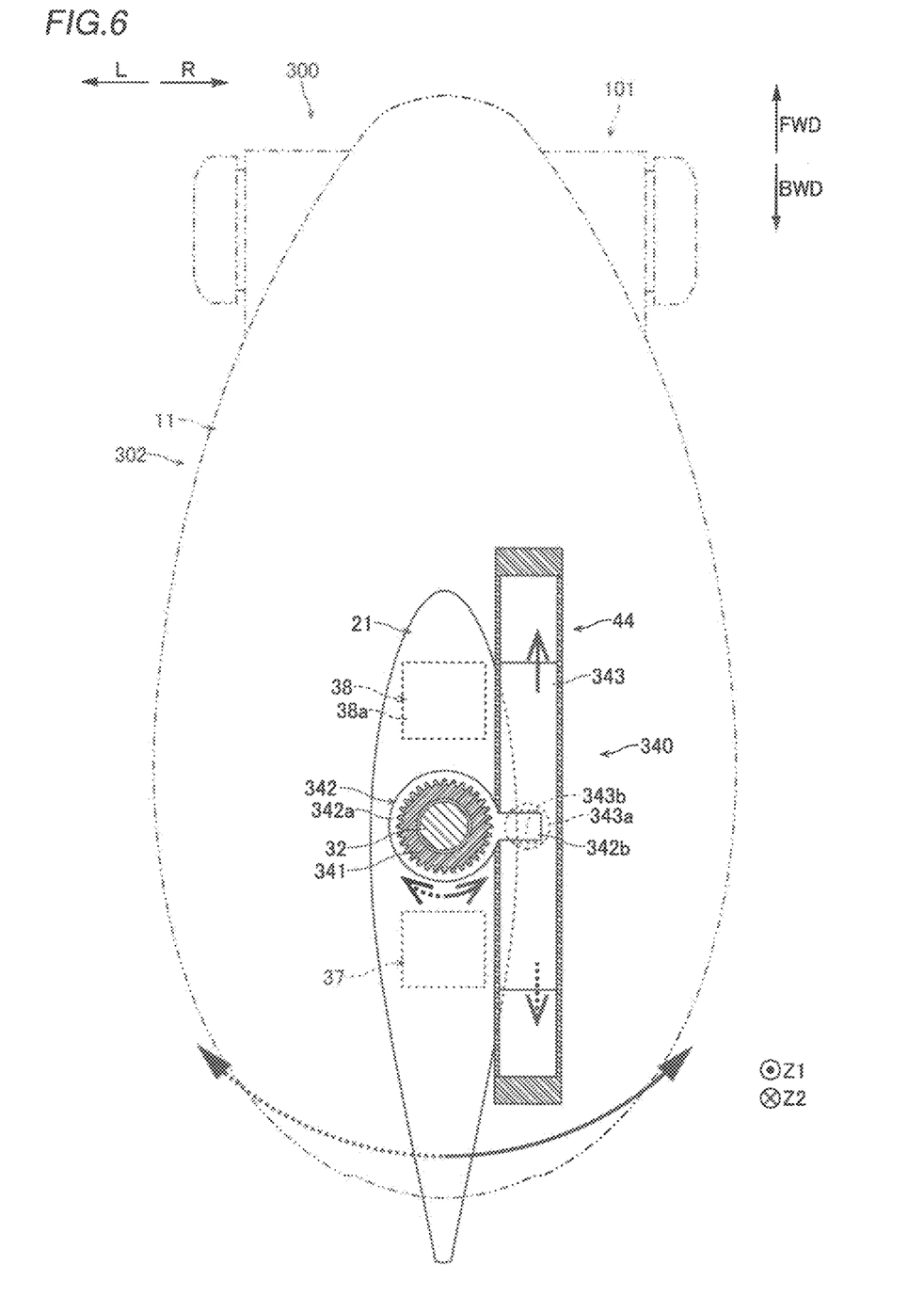
FIG. 6 is a plan view showing a steering mechanism of an outboard motor according to a second modified example of a preferred embodiment of the present invention.

While the steering mechanism 40 preferably converts linear motion into rotary motion with the rack 43 and the pinion 42 in preferred embodiments described above, the present invention is not restricted to this. In a preferred embodiment of the present invention, as in a second modified example shown in FIG. 6, a steering mechanism may alternatively convert linear motion into rotary motion with components other than a rack and a pinion. As shown in FIG. 6, an outboard motor 300 according to the second modified example includes an outboard motor body 302 and a steering mechanism 340 to rotate the outboard motor body 302 about a steering shaft 341. The steering mechanism 340 includes a link member 342 that rotates together with the outboard motor body 302, and a piston 343 that linearly moves to rotate the link member 342. The piston 343 extends along the forward-rearward direction of the outboard motor body 302. Specifically, the link member 342 includes a cylindrical portion 342a that surrounds the steering shaft 341, and an arm 342b extending from the cylindrical portion 342a toward the piston 343. The cylindrical portion 342a is fixed to the steering shaft 341 by spline engagement such that the steering shaft 341 rotates as the cylindrical portion 342a rotates. The piston 343 is located in a central portion of the piston 343 in the forward-rearward direction of the outboard motor body 302, and includes a rotor 343a that is rotatable with respect to the piston 343. The arm 342b is fixed to the piston 343 by being fitted into a hole 343b of the rotor 343a of the piston 343. When the piston 343 is linearly moved in the forward-rearward direction of the outboard motor body 302, the position of the arm 342b with respect to the steering shaft 341 changes while the rotor 343a of the piston 343 rotates. As the position of the arm 342b with respect to the steering shaft 341 changes, the cylindrical portion 342a fixed to the steering shaft 341 rotates. The link member 342 and the piston 343 are examples of a "rotary member" and a "linearly moving member", respectively.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
an outboard motor body; and
a steering mechanism to rotate the outboard motor body about a steering shaft; wherein
the steering mechanism includes:
a pinion located in a central portion of the outboard motor body in a right-left direction and operable to rotate together with the outboard motor body; and
a rack operable to linearly move to rotate the pinion, and extending along a forward-rearward direction of the outboard motor body;
the outboard motor body includes an engine and a cooling water passage to allow cooling water to pass therethrough to cool the engine;
the rack is located within a height range in which the cooling water passage extends in an upward-downward direction of the outboard motor body;
the cooling water passage includes a cooling water pump to circulate the cooling water in the cooling water passage; and
the cooling water pump is located at a height at which the rack is provided.

2. The outboard motor according to claim 1, wherein the rack is located inward of an outermost end of the outboard motor body in the right-left direction of the outboard motor body.

3. The outboard motor according to claim 2, wherein
the outboard motor body includes a cowling to house the engine; and
the rack is located inward of an outermost end of the cowling in the right-left direction of the outboard motor body.

4. The outboard motor according to claim 1, wherein
the outboard motor body is to be attached to a stern of a hull via a bracket; and
the rack is located inward of an outermost end of the bracket in the right-left direction of the outboard motor body.

5. The outboard motor according to claim 1, wherein
the outboard motor body includes an exhaust passage extending in the upward-downward direction of the outboard motor body and operable to allow an exhaust gas generated in the engine to pass therethrough; and
the rack is located within a height range in which the exhaust passage extends in the upward-downward direction of the outboard motor body, and is located outward of the exhaust passage in the right-left direction of the outboard motor body.

6. The outboard motor according to claim 5, wherein the pinion is located forward of the exhaust passage.

7. The outboard motor according to claim 1, wherein the rack is located outward of the cooling water passage in the right-left direction of the outboard motor body.

8. The outboard motor according to claim 7, wherein the pinion is located rearward of the cooling water pump.

9. An outboard motor comprising:
an outboard motor body; and
a steering mechanism to rotate the outboard motor body about a steering shaft; wherein
the steering mechanism includes:
a pinion located in a central portion of the outboard motor body in a right-left direction and operable to rotate together with the outboard motor body; and
a rack operable to linearly move to rotate the pinion, and extending along a forward-rearward direction of the outboard motor body;
the rack includes a pair of racks; and
the pair of racks are operable to sandwich the pinion from both sides in the right-left direction of the outboard motor body.

10. The outboard motor according to claim 1, wherein the rack is located below an upper end of a stern of a hull.

11. The outboard motor according to claim 1, wherein
the outboard motor body is to be attached to a stern of a hull via a bracket; and
the rack is located in a vicinity of a lower end of the bracket in the upward-downward direction of the outboard motor body.

12. An outboard motor comprising:
an outboard motor body; and
a steering mechanism to rotate the outboard motor body about a steering shaft; wherein
the steering mechanism includes:
a pinion located in a central portion of the outboard motor body in a right-left direction and operable to rotate together with the outboard motor body; and
a rack operable to linearly move to rotate the pinion, and extending along a forward-rearward direction of the outboard motor body:
the outboard motor body includes a lower case in a lower portion of the outboard motor body;
the steering mechanism further includes a hydraulic cylinder to house and linearly move the rack; and the hydraulic cylinder includes a front end located forward of a front end of the lower case.

13. The outboard motor according to claim 1, wherein the outboard motor body includes:
an upper portion to be attached to a hull via a bracket; and
a lower portion located below the upper portion and on which a propeller is provided; and
the steering mechanism is operable to rotate the lower portion about the steering shaft with respect to the upper portion.

14. An outboard motor comprising:
an outboard motor body; and
a steering mechanism to rotate the outboard motor body about a steering shaft; wherein
the steering mechanism includes:
a rotary member located in a central portion of the outboard motor body in a right-left direction and operable to rotate together with the outboard motor body; and
a linearly moving member operable to linearly move to rotate the rotary member, and extending along a forward-rearward direction of the outboard motor body;
the outboard motor body includes an engine and a cooling water passage to allow cooling water to pass therethrough to cool the engine;
the linearly moving member is located within a height range in which the cooling water passage extends in an upward-downward direction of the outboard motor body;
the cooling water passage includes a cooling water pump to circulate the cooling water in the cooling water passage; and
the cooling water pump is located at a height at which the linearly moving member is provided.

15. A marine vessel comprising:
a hull; and
an outboard motor attached to a stern of the hull; wherein
the outboard motor includes:
an outboard motor body; and
a steering mechanism to rotate the outboard motor body about a steering shaft; and
the steering mechanism includes:
a pinion located in a central portion of the outboard motor body in a right-left direction and operable to rotate together with the outboard motor body; and
a rack operable to linearly move to rotate the pinion, and extending along a forward-rearward direction of the outboard motor body;
the outboard motor body includes an engine and a cooling water passage to allow cooling water to pass therethrough to cool the engine;
the rack is located within a height range in which the cooling water passage extends in an upward-downward direction of the outboard motor body;
the cooling water passage includes a cooling water pump to circulate the cooling water in the cooling water passage; and
the cooling water pump is located at a height at which the rack is provided.

16. The marine vessel according to claim 15, wherein the rack is located inward of an outermost end of the outboard motor body in the right-left direction of the outboard motor body.

17. The marine vessel according to claim 16, wherein
the outboard motor body includes a cowling to house the engine; and
the rack is located inward of an outermost end of the cowling in the right-left direction of the outboard motor body.

18. The marine vessel according to claim 15, wherein
the outboard motor body is attached to the stern of the hull via a bracket; and
the rack is located inward of an outermost end of the bracket in the right-left direction of the outboard motor body.

19. The marine vessel according to claim 15, wherein
the outboard motor body includes an exhaust passage extending in the upward-downward direction of the outboard motor body and operable to allow an exhaust gas generated in the engine to pass therethrough; and
the rack is located within a height range in which the exhaust passage extends in the upward-downward direction of the outboard motor body, and is located outward of the exhaust passage in the right-left direction of the outboard motor body.

20. The marine vessel according to claim 15, wherein the outboard motor includes a plurality of outboard motors attached to the stern of the hull and aligned in a right-left direction of the hull.

* * * * *